United States Patent [19]
Klein

[11] Patent Number: 5,913,067
[45] Date of Patent: Jun. 15, 1999

[54] APPARATUS FOR ADAPTIVE POWER MANAGEMENT OF A COMPUTER SYSTEM

[75] Inventor: Dean A. Klein, Eagle, Id.

[73] Assignee: Micron Electronics, Inc., Nampa, Id.

[21] Appl. No.: 08/961,582

[22] Filed: Oct. 31, 1997

Related U.S. Application Data

[63] Continuation of application No. 08/739,527, Oct. 29, 1996.

[51] Int. Cl.$^6$ ........................................... G06F 1/00
[52] U.S. Cl. ......................................... 395/750.01
[58] Field of Search ........................ 395/750.01–750.08, 395/68; 364/707

[56] References Cited

U.S. PATENT DOCUMENTS

| | | | |
|---|---|---|---|
| 4,922,450 | 5/1990 | Rose et al. | 395/750.02 |
| 5,128,938 | 7/1992 | Borras | 370/311 |
| 5,339,445 | 8/1994 | Gasztonyi | 395/750.06 |
| 5,349,688 | 9/1994 | Nguyen | 395/800 |
| 5,452,277 | 9/1995 | Bajorek et al. | 395/750.08 |
| 5,481,733 | 1/1996 | Douglis et al. | 395/750 |
| 5,493,670 | 2/1996 | Pouglis et al. | 395/750.06 |
| 5,511,203 | 4/1996 | Wisor et al. | 395/750.04 |
| 5,560,024 | 9/1996 | Harper et al. | 395/750 |
| 5,652,895 | 7/1997 | Poisner | 395/750.04 |
| 5,657,281 | 8/1997 | Rao | 365/200 |
| 5,666,540 | 9/1997 | Hagiwara et al. | 395/750.05 |
| 5,682,273 | 10/1997 | Hetzler | 395/750.06 |

OTHER PUBLICATIONS

Intel Corporation *430MX PCISET, 82437MX Mobile System Controller (MTSC) and 82438MX Mobile Data Path (MTDP)* 70 pp., Apr. 1996.

PICO Power, A Cirrus Logic Division *Vesuvius–LS Preliminary Data Book* 384 pp., Sep. 1995.

*Primary Examiner*—Ayaz R. Sheikh
*Assistant Examiner*—Paul R. Myers
*Attorney, Agent, or Firm*—Seed and Berry LLP

[57] ABSTRACT

A method and apparatus for improved computer system power management is described. A power management controller includes a plurality of device idle timers, each associated with a particular I/O device. Expiration of the device idle timers, and the placing of the associated I/O device into a powered-down state, is controlled by device idle time values programmed into timing registers. The device idle time values are regularly updated as a function of time of day, time of week, etc., to optimize power efficiency. The device idle time values are determined by monitoring and recording the history of I/O device use. Thus, an I/O device may be quickly powered-down during those time periods during which device activity is not expected, whereas the I/O device will be maintained in a powered-up state during those times when device activity is probable. Also included are device activation timers which activate a powered-down computer system or particular I/O device in anticipation of a subsequent system event.

32 Claims, 3 Drawing Sheets

Adaptive Power Managment

Adaptive Power Managment

APPARATUS FOR ADAPTIVE POWER MANAGEMENT OF A COMPUTER SYSTEM

CROSS-REFERENCE TO RELATED APPLICATION

This application is a continuation of U.S. patent application Ser. No. 08/739,527, filed Oct. 29, 1996.

DESCRIPTION

1. Technical Field

The present invention relates generally to an apparatus for power management of a computer system, and more particularly, for optimizing power management of a computer system based on user interaction with the computer system.

2. Background of the Invention

The use of computers, especially personal computers (PCs) is widespread. A PC includes a number of individual components, such as a microprocessor, memory modules, various system and bus control units, and a wide variety of data input/output (I/O) devices. The components included in a PC require electrical power for operation. Significant amounts of energy may be wasted in the event one or more of the PC components is not used while maintained in a powered-up state. This can be particularly disadvantageous for portable notebook computers, which rely on batteries for their power. In order to provide more energy-efficient PCs, power management techniques and circuitry have been developed which place one or more of the PC components into a powered-down state at appropriate times. For example, a particular I/O device may have an associated device timer which tracks the time elapsed since the last activity of the I/O device. After a predetermined time interval has elapsed, with no I/O device activity, the I/O device is put into a powered-down state. Similarly, there exist system mode timers which track the time elapsed since any user interaction or other selected event occurs with the PC generally. For example, a typical notebook computer can successively enter states or modes of progressively lower power consumption until a user interaction or other selected event occurs. Typical computers have states such as Full-On, Standby or Doze, Sleep, Deep Sleep or Suspend, and Off.

One disadvantage of current art power management systems is that significant energy may still be wasted during those idle time periods prior to the PC entering the lower power consumption anodes. A second disadvantage is that a PC, once in a low power consumption mode, may be slow to respond to subsequent user interaction with the PC. For example, if the system is in the Suspend mode, the video display monitor may be completely unpowered. To transition to Full-On may require several seconds for the display to function. If A instead the system or video display monitor were in the Standby mode, a transition to Full-On will be much quicker. Current systems and techniques for power management in PCs are less than optimal in balancing the need to maximize both power conservation and system responsiveness to user interaction.

SUMMARY OF THE INVENTION

The present invention is embodied in a method and apparatus for improved computer system power management. A computer system includes a power management controller having a plurality of device idle timers, each associated with a particular I/O device. Upon expiration of the associated device idle timer, the I/O device is placed into a powered-down state. Expiration of the device idle timers is controlled by device idle time values programmed into timing registers. The device idle time values are determined by monitoring and recording the history of I/O device activity, and the timing registers are regularly updated as a function of time of day, time of week, etc. Also included are device activation timers which activate a previously powered-down I/O device in anticipation of subsequent I/O device activity, as a function of the recorded history of such activity.

In one embodiment, a computer system includes a clock which provides a current time. A processor is operable to access an I/O device to transfer data to and from the I/O device. The processor monitors I/O device activity and determines a plurality of device idle time intervals as a function of the current time. A power management controller is coupled with the processor and with the clock and includes a device idle timer. The processor powers-down the I/O device upon expiration of the device idle timer. The device idle timer expires after no I/O device activity has occurred for a time interval approximately equal to the device idle time interval corresponding with the current time.

A method of operating a computer system having a processor and an I/O device includes the step of selecting a plurality of calendar time periods. During each of the calendar time periods, a time interval is measured in which the I/O device is inactive. During a subsequent occurrence of a given calendar time period, the I/O device is powered-down after having been inactive for a time interval corresponding to the previously measured inactivity time interval for that calendar time period.

In a second embodiment, a computer system includes a processor which operates to perform a sequence of data transfers with an I/O device. The processor itself powers-down after one of these device accesses. A power management controller is included which operates to power-up the processor prior to a next one of the sequential I/O device accesses.

DETAILED DESCRIPTION OF THE INVENTION

In the following, a novel computer system and method for improved power management is described with certain specific details set forth in order to provide a sufficient understanding of the present invention. It will be clear, however, to one skilled in the art, that the present invention may be practiced without these details. In other instances, well-known circuits, control signals, timing protocols, and software operations have not been shown in detail in order not to unnecessarily obscure the invention.

Figure 1:
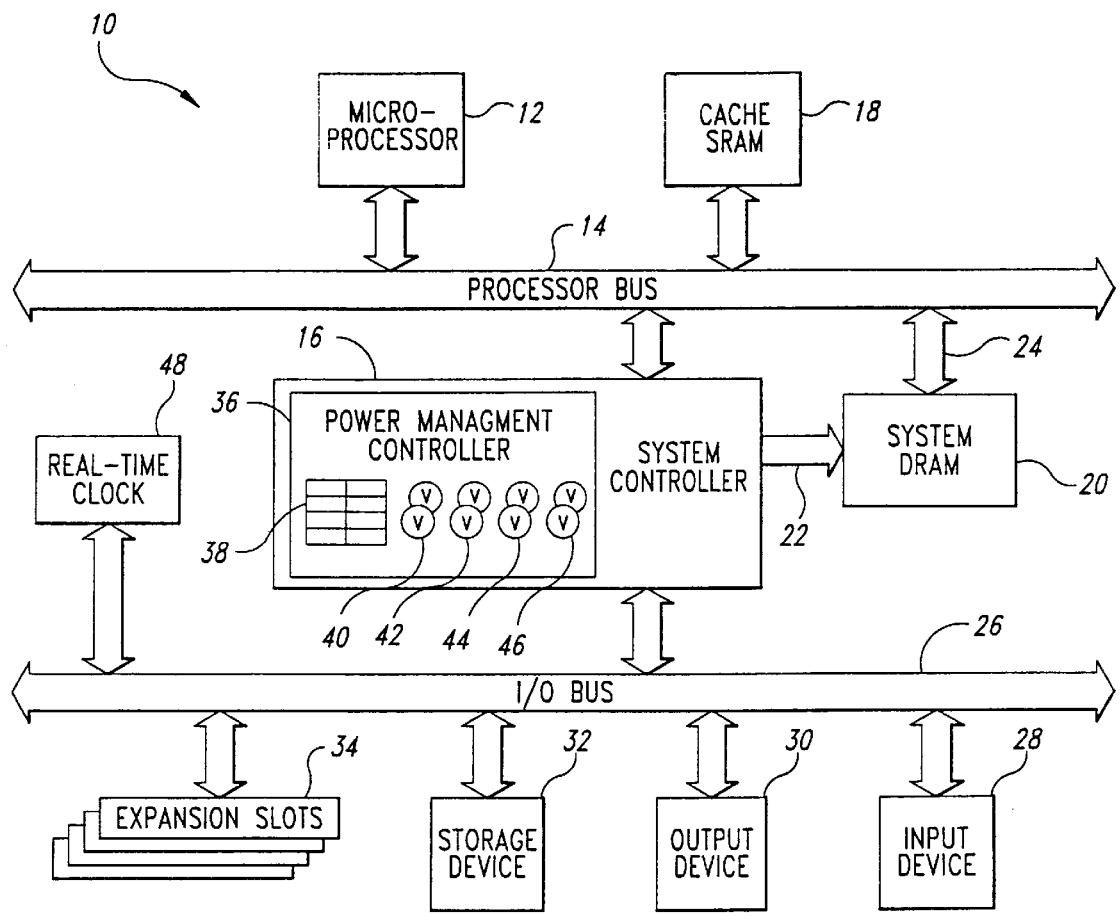
FIG. 1 is a functional block diagram of a preferred embodiment of a computer system having a power management controller according to the present invention.

FIG. 1 shows a preferred embodiment of a computer system 10, such as an IBM-compatible PC, according to the present invention. A microprocessor 12, such as a Pentium® processor, is connected to a processor bus 14 which carries address, data, and control signals. The processor bus 14 is in turn connected to a system controller 16. An example of a current art system controller is the Picopower™ Vesuvius V1-LS controller. The processor bus 14 is also connected to a cache memory 18, such as a static random access memory (SRAM) array. The system controller 16 acts as a memory controller accessing a main memory, such as a system dynamic random access memory (DRAM) 20, via a memory address and control bus 22. A data portion of the processor bus 14 is coupled with the system DRAM 20 by a memory data bus 24. The system DRAM 20 can include any of various known memory devices, such as DRAM devices manufactured by Micron Technology, Inc.

The system controller 16 also functions as a bridge circuit between the processor bus 14 and a system bus, such as I/O bus 26. The I/O bus 26 may itself be a combination of one or more bus systems with associated interface circuitry (e.g., PCI bus with connected SCSI and ISA bus systems). Connected to the I/O bus 26 is a real-time clock (RTC) and calendar chip 48, which provides calendar date and time information to system management software executed by the microprocessor 12. Also coupled with the I/O bus 26 are multiple I/O devices 28–32. One or more data input devices 28, such as a keyboard, mouse, etc., are coupled with the I/O bus 26. Also, one or more data output devices 30, such as visual display devices, printers, etc., are coupled with the I/O bus 26. Additionally, one or more data storage devices 32, such as disk drives, tape drives, CD-ROM drives, etc., are coupled with the I/O bus 26. Also coupled with the I/O bus 26 are expansion slots 34 to provide future accommodation of other I/O devices not selected during the original design of the computer system.

The system controller 16 includes a power management controller 36 having a plurality of programmable timing registers 38 associated with a plurality of device idle timers 40, system mode timers 42, device activation timers 44, and high speed timers 46, whose function is described in detail below. Other functions included in the system controller 16, which may or may not be integrated on a single chip, include reset and clock interface circuitry, cache controller circuitry, memory data path control circuitry, system interrupt control circuitry, and general processor bus and I/O bus interface circuitry.

Conventional power management controllers include the device idle timers 40, system mode timers 42, and an associated subset of the timing registers 38. The timing registers are programmed once during initialization of the computer system, and the power management controller causes the system components to be powered-down according to the information programmed into the timing registers. For example, the timing registers might include a programmed value causing a printer to be placed in a powered-down state after an elapsed fifteen-minute time period of printer inactivity. This fifteen-minute time period applies independent of the particular time of day or time of week. If, for example, the last printer activity occurred at 5:55 p.m., the printer is placed in the powered-down state at 6:10 p.m. This may be inefficient, particularly if the printer is rarely used after 6:00 p.m.

In accordance with the present invention, the timing registers 38 are reprogrammed regularly with new values related to the history of user interaction with the computer system 10. Thus, the printer in the example above is placed in the powered-down state soon after 6:00 p.m., while the fifteen-minute inactivity time period applies earlier in the day. In this case, certain ones of the timing registers 38 are reprogrammed based upon a recorded activity history (as described below) of little or no printer usage following 6:00 p.m. The preferred embodiment of the computer system 10 tracks the activity of each of the various I/O devices 28–32, and updates device idle time values programmed in the timing registers 38 as a function of time of day, time of week, etc., to reflect the likely device activity as a function of time of day, time of week, etc.

Figure 2:
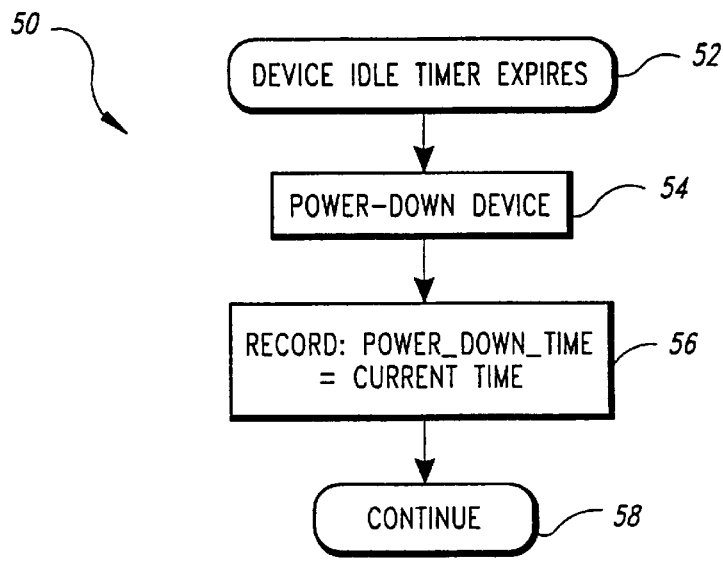
FIGS. 2–4 are flowcharts depicting a method of operating the computer system of FIG. 1.
Figure 3:
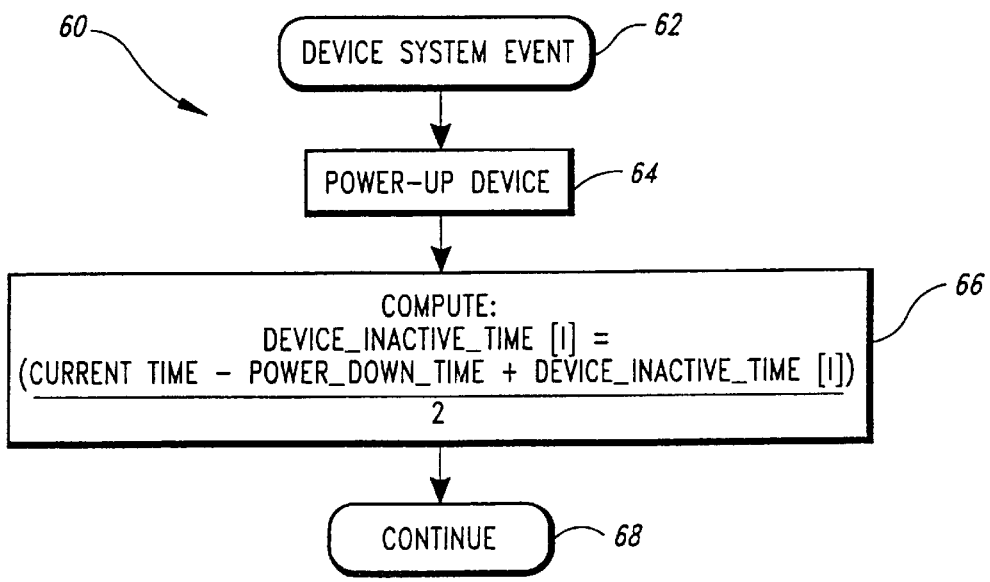

FIGS. 2 and 3 depict software routines 50 and 60, respectively, executable by the microprocessor 12 to track the history of device activity. These software routines are preferably stored in system management memory and executed by the microprocessor in a system management mode, as is well known in the art. In step 52, the device idle timer 40 associated with one of the I/O devices 28–32 expires. In step 54, the I/O device is powered-down in a conventional manner. In step 56, a value Power-Down-Time is calculated as the current time provided by the RTC 48. Normal processor operations 58 then continue.

In step 62, subsequent access to the powered-down I/O device occurs. In step 64, the I/O device is powered-up in a conventional manner. In step 66, an array value Device-Inactive-Time is calculated. In one embodiment, as depicted in FIG. 3, the array value Device-Inactive-Time is calculated as a running average of the previous array value Device-Inactive-Time with the time elapsed since the time corresponding to the value Power-Down-Time. Alternatively, the array value Device-Inactive-Time could be calculated in any of a number of potentially useful ways, such as recent minimum or maximum values or a running average including more than the two most recent values, or a weighted running average giving greater weight to the previous array value Device-Inactive-Time. The Device-Inactive-Time array is stored in registers, nonvolatile memory, battery-powered volatile memory, or other suitable storage device. Normal processor operations 68 then continue.

The Device-Inactive-Time array has an index value I which corresponds with a selected calendar time period, such as the time of day, time of week, and/or other suitable measurement of device activity time periods. For example, Table 1 depicts a portion of the Device-Inactive-Time array for a printer.

TABLE 1

| Time Period | *** | Monday 6–9 pm | Monday 9 pm–12 am | Tuesday 12–3 am | Tuesday 3–6 am | Tuesday 6–9 am | Tuesday 9 am–12 pm | Tuesday 12–3 pm | Tuesday 3–6 pm | *** |
|---|---|---|---|---|---|---|---|---|---|---|
| I | *** | 0 | 1 | 2 | 3 | 4 | 5 | 6 | 7 | *** |
| Device-Inactive-Time (Running Average) | *** | 3.0 hours | 3.0 hours | 3.0 hours | 3.0 hours | 3.0 hours | 0.5 hours | 1.5 hours | 2.0 hours | *** |

As shown in Table 1, a 24-hour time period is split into 8 three-hour portions corresponding with the index value I ranging from 0 to 7. Those skilled in the art will appreciate that Table 1 is for illustration purposes only, and the calendar time period associated with a given index value may be of much smaller duration than the three hours depicted. Also, the calendar time periods need not be of equal duration. Indeed, the boundaries between calendar time periods, and the lengths of those time periods, may themselves be selectively modified as a function of the recorded device activity history.

Referring to the example of Table 1, the history of printer activity shows the printer to be inactive from 6:00 p.m. Monday evening until 9:00 a.m. Tuesday morning. The printer is then used quite regularly during the Tuesday morning hours, from 9:00 a.m. to noon, and is used less frequently during the Tuesday afternoon hours. In accordance with the present invention, the timing registers 38 are regularly reprogrammed with device idle time values corresponding with the given calendar time period. Thus, the device idle timer 40 associated with the printer expires at a time appropriate to the printer activity history depicted in Table 1. For example, the printer idle timer might expire after 5 minutes of inactivity during the time period from Monday, 6:00 p.m. until Tuesday, 9:00 a.m. The printer idle timer might then expire after 15 minutes of printer inactivity during the time period of Tuesday, 9:00 a.m. to 12:00 p.m., and after 10 minutes of printer inactivity during the afternoon hours. In this way, the printer is quickly powered-down during those time periods during which printer activity is unlikely, and is maintained in a powered-up state during those times in which printer activity is likely, as indicated by the recorded printer activity history. Those skilled in the art will appreciate that the particular printer idle time values mentioned are for purposes of illustration only. Determining device idle time values, as a function of the expected device inactivity (i.e., the recorded Device-Inactive-Time values), may be performed by conventional calculation methods, graphical methods, look-up table methods, etc. The various device idle time values may themselves be stored, or may be determined anew each time the timing registers 38 are programmed.

Figure 4:
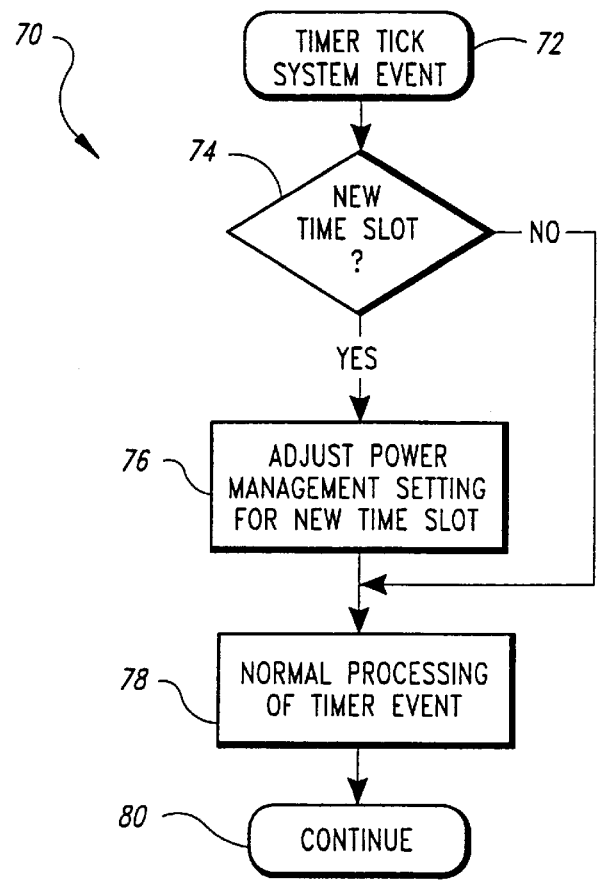

FIG. 4 depicts a software routine 70 (also stored in system management memory) executable by the microprocessor 12 to increment the index value I of the array Device-Inactive-Time, and to update the values programmed in the timing registers 38 accordingly. Following each timer tick event 72 produced by the real-time clock, a conditional branch step 74 is executed. If the calendar time period (e.g., time of day, time of week, etc.), corresponds with an index value I other than the one currently assigned, the index value is incremented in step 76 and the timing registers 38 are reprogrammed accordingly. Normal processing of the timer tick event then follows in step 78. If the calendar time period is not such that the index value I should be incremented, the conditional branch step 74 routes the program 70 to the normal processing of the timer tick event in step 78. Normal processor operations 80 then continue. In this way, the device idle time values programmed into the timing registers 38 are continually updated as a function of recent device and system activity, as monitored and recorded in accordance with programs 50 and 60.

Each of the I/O devices 28–32 has an associated one of the device idle timers 40. Thus, in accordance with the present invention, a Device-Inactive-Time array is maintained for each of the I/O devices 28–32. In this way, system energy efficiency is improved by powering-down those devices which are not expected to be active during a given time period, while maintaining those other devices for which device activity is expected in a powered-up state for longer periods of idle time. Similarly, the method described in connection with FIGS. 2–4 can be applied to the system mode timers 42.

Conventionally, the microprocessor in a computer system is placed into a succession of lower power consumption modes as more and more time elapses during which the computer system is generally inactive. For example, a microprocessor might be placed in a Standby mode after 5 minutes of system inactivity, in a Sleep mode after 10 minutes of inactivity, and in a Suspend mode after 15 minutes of inactivity. Those skilled in the art will appreciate that even in powered-down modes, the microprocessor continues to process instructions associated with low level system activity, such as timer tick events. The system or microprocessor is referred to as inactive even while processing such low level system activity.

Conventionally, the timing registers associated with each of the processor modes are programmed only once during initialization of the computer system, and are programmed with values independent of the particular time of day, time of week, etc. In accordance with the present invention, those of the timing registers 38 associated with the system mode timers 42 are regularly reprogrammed with processor mode time values related to a recorded history of microprocessor activity. Those skilled in the art will appreciate that the monitoring and recording of microprocessor activity may be performed in substantially the same manner as described in connection with FIGS. 2–4 for the I/O devices 28–32.

Numerous advantages relative to the prior art are provided by the computer system 10 operated in accordance with the computer programs 50, 60, and 70. For example, a particular computer system 10 may be used regularly only from 9:00 a.m. to 6:00 p.m. The programs 50, 60, and 70 then account for this history by programming values into the timing registers 38 which power-down the I/O devices 28–32 and the microprocessor 12 quickly after 6:00 p.m., while keeping these components in a powered-up state for longer periods of inactivity during the 9:00 a.m. to 6:00 p.m. time interval. In this way, the present invention provides improved energy efficiency while maintaining ready and rapid access to computer system capabilities during the time the computer system 10 is normally used. Computer programs 50, 60, and 70 also provide improved power management during the time period from 9:00 a.m. to 6:00 p.m., depending upon any regular use histories associated with each of the individual I/O devices 28–32. For example, if a printer is regularly used only during the morning hours, while a video display is used throughout the day, the values programmed in the timing registers 38 can be adjusted accordingly. Thus, the printer will be quickly powered-down following any activity during the afternoon, while the video display unit will be maintained in a powered-on state for longer periods of inactivity during the afternoon hours. This contrasts with the current state of the art, in which the powering-down of various system components is performed after component idle times independent of the history of computer system activity.

A further enhancement of the computer system 10 powers-up system components in anticipation of system usage. For example, if the computer system 10 is regularly used only during the hours of 9:00 a.m. to 6:00 p.m., a powered-down system could be "awakened" at 8:55 a.m. This is accomplished by including the device activation timers 44 in the power management controller 36 (see FIG. 1). The device activation timers may be of circuit construction similar to the device idle timers 40 and system mode timers 42 typically included in conventional power management controllers. However, instead of counting the component idle time of powered-up components, the device activation timers 44 begin counting time after the associated device is powered-down. Certain ones of the timing registers 38 are associated with the device activation timers 44 and are programmed with device activation time values which determine the expiration of the device activation timers. In the printer example described above in connection with Table 1, the printer activation timer begins counting subsequent to 6:00 p.m., Monday, and expires just prior to 9:00 a.m., Tuesday. Of course, should printer activity be initiated prior to the expiration of the printer activation timer, the printer would be powered-up and the printer I/O access trapped and buffered in a conventional manner.

The use of activation timers 44 is particularly advantageous for regularly occurring, or periodic, events. In the example above, the periodic event is system inactivity from 6:00 p.m. Monday evening until 9:00 a.m. Tuesday morning. However, activation timers can be employed for periodic events of a much higher frequency. For example, separately dedicated device activation timers, such as high speed timers 46, are dedicated to those periodic events such as typing on a keyboard, tracking a pointing device, sequentially scanning hard disk sectors, receiving Ethernet packets, etc. The amount of time required to process these events by the microprocessor 12 is typically much less than the time period of the event. Thus, for example, the microprocessor 12 can be placed in a Standby mode immediately subsequent to the processing of a keyboard entry and then powered-up to a Full-On mode in anticipation of the next keyboard event.

Even while a user might constantly interact with the computer system, such as by typing or entering instructions with a mouse, significant energy savings is achieved by periodically powering-down the microprocessor 12 during such activity. For example, the high speed timer 46 associated with the keyboard is triggered by a keyboard interrupt signal or hardware decoder signal, and the timing registers 38 include activation time values controlling the expiration of the high speed timers. These values can be of a predetermined fixed nature, for activities such as scanning disk sectors, or be provided during system initialization as part of the device configuration parameters. Alternatively, the activation time values can be determined by monitoring and recording the activity history to, for example, optimally match the speed of a particular typist.

Figure 5:
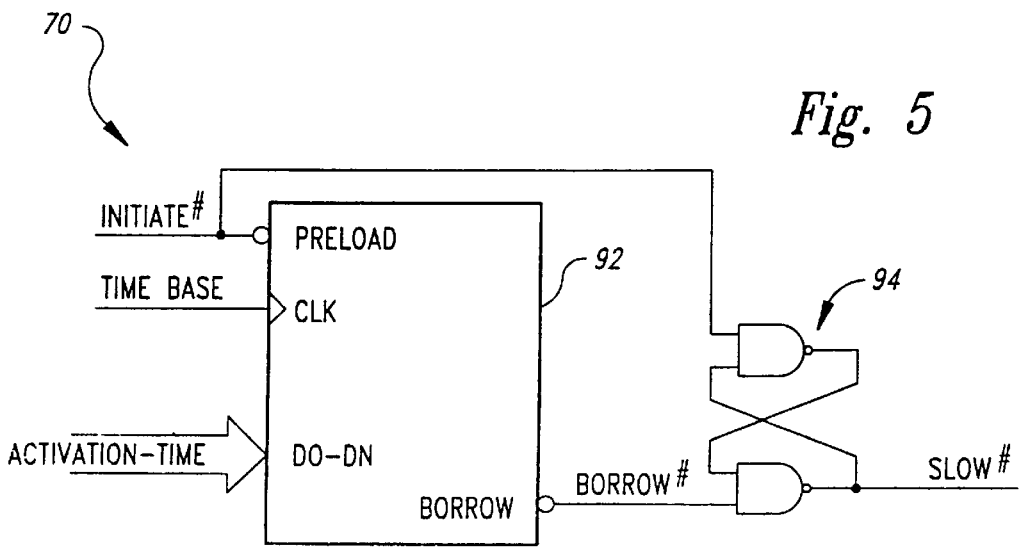
FIG. 5 is a part block, part logic diagram of a preferred embodiment of a timer used in the power management controller of FIG. 1.

Although timers such as those conventionally used for device idle and system mode timers may be readily adapted for use as activation timers 44 and high speed timers 46, a preferred embodiment is described for purposes of illustration. FIG. 5 depicts a timing circuit 90 which includes a down-counter 92 and a latch 94 conventionally constructed from two cross-coupled NAND gates. An asserted INITIATE# signal sets the latch 94 with an asserted SLOW# output signal and loads an ACTIVATION-TIME value from the timing registers 38. The down-counter 92 receives a TIME BASE clock input and counts down from the loaded ACTIVATION-TIME value. The down-counter 92 asserts a BORROW# output signal upon completed countdown and resets the latch 94 to deassert the SLOW# signal.

Separate timing circuits 90 may be provided as a device activation timer 44 and as a high speed timer 46 for each of the I/O devices 28–32 included in the computer system 10. Conventional logic circuitry receives the various SLOW# latch output signals and controls the operation of the microprocessor 12 via, for example, the well-known system management interrupt (SMI) signal and the processor STOPCLK signal. Thus, when no one of the I/O devices 28–32 requires attention from the microprocessor 12, the microprocessor may be placed in a lower power consumption mode from which it is subsequently reactivated in anticipation of the next system event. In the case of the device activation timers 44, the INITIATE# signal is preferably derived from the expiration of the associated device idle timer 40, and the TIME BASE clock frequency is quite low, such as 1 Hz. In the case of the high speed timers 46, the INITIATE# signal is preferably derived from an associated hardware interrupt or decoder signal, and the TIME BASE clock frequency is rather high, such as 1 MHz. The ACTIVATION-TIME values associated with each of the device activation timers 44 and high speed timers 46 are programmed by the microprocessor 12 into the timing registers 38 as a function of time of day, time of week, etc., in much the same way as described above in connection with the device idle timers 40 and system mode timers 42.

Those skilled in the art will appreciate that many of the individual steps depicted in FIGS. 2–4 and described above are in fact each a sequence of operations which are well-known in the art. One skilled in the art would be able to program such operations in the described sequence to practice the present invention. The various operations associated with each of the steps depicted in FIGS. 2–4 are not part of, nor critical to, the invention. Therefore, a detailed description of these operations is not required. Similarly, each of the circuits whose function and interconnection is described above in connection with FIGS. 1 and 5 are of a type known in the art, and one skilled in the art would be able to use such circuits in the described combination to practice the present invention. The internal details of these particular circuits are not part of, nor critical to, the invention, and a detailed description of the internal circuit operation need not be provided.

From the foregoing it will be appreciated that, although specific embodiments of the invention have been described herein for purposes of illustration, various modifications may be made without deviating from the spirit and scope of the invention. For example, the power management controller 36 need not be integrated into the system controller 16, although it is preferable to do so. Also, while the timing registers have been described as separate from the associated timers, the programmable timing parameter storage function can be integrated into the various timers themselves. Those skilled in the art will appreciate that any number of well-known processor types, bus types, and system controller types could be employed according to the present invention. Additionally, variations on the sequence of operations described in connection with FIGS. 2–4 are contemplated within the scope of the present invention. Those skilled in the art will also appreciate that many of the operations determining values by calculational methods, may instead employ equivalent methods such as graphical methods, employing look-up tables, or employing digital and/or analog circuitry to manipulate/modulate signal magnitudes to convey equivalent information content. Accordingly, the invention is not limited except as by the appended claims.

I claim:

1. A computer system, comprising:
   a clock operable to provide a current time;
   a processor operable to access an I/O device to transfer data to and from the I/O device, the processor also operable to monitor I/O device activity to determine a plurality of device idle time intervals, each associated with a respective one of a plurality of calendar time periods; and a power management controller coupled with the processor and with the clock, the power management controller including a device idle timer operable to cause the I/O device to be powered-down after no I/O device activity has occurred for a time interval approximately equal to the device idle time interval corresponding with the current time.

2. The computer system of claim 1 wherein the processor is also operable to monitor processor activity to determine a plurality of processor mode time intervals, each associated with a respective one of the calendar time periods, and wherein the power management controller includes a processor mode timer operable to cause the processor to be powered-down after no processor activity has occurred for a time interval approximately equal to the processor mode time interval corresponding with the current time.

3. The computer system of claim 1 wherein the processor is also operable to determine a plurality of I/O device activation time intervals, each associated with a respective one of the calendar time periods, and wherein the power management controller further includes a device activation timer operable to cause the I/O device to be powered-up after the I/O device has been in a powered-down state for a time interval approximately equal to the device activation time interval corresponding with the current time.

4. A computer system, comprising:
   an I/O device;
   a processor coupled with the I/O device and operable to transfer data therefrom or thereto; and
   a power management controller coupled with the I/O device and the processor and operable to power-down the I/O device after the I/O device has been inactive for a time interval corresponding to one of a plurality of device idle time values, each associated with a respective one of a plurality of calendar time periods.

5. The computer system of claim 4, further comprising a clock coupled with the power management controller and operable to provide a current calendar time, the one of the device idle time values being associated with one of the calendar time periods including the current calendar time.

6. The computer system of claim 4 wherein the power management controller includes a device idle timer that is programmable with the one of the device idle time values, the device idle timer controlling the timing of the powering-down of the I/O device.

7. The computer system of claim 4 wherein the power management controller is operable to store the device idle time values.

8. The computer system of claim 4 wherein the processor is operable to monitor I/O device activity and to correspondingly modify the device idle time values.

9. The computer system of claim 4 wherein the processor is operable to monitor I/O device activity and to correspondingly modify the calendar time periods.

10. A computer system, comprising:
    an I/O device;
    a processor coupled with the I/O device and operable to transfer data therefrom or thereto; and
    a power management controller coupled with the I/O device and the processor and operable to power-down the processor after the processor has been inactive for a time interval corresponding to one of a plurality of processor mode time values, each associated with a respective one of a plurality of calendar time periods.

11. The computer system of claim 10, further comprising a clock coupled with the power management controller and operable to provide a current calendar time, the one of the processor mode time values being associated with one of the calendar time periods including the current calendar time.

12. The computer system of claim 10 wherein the power management controller includes a system mode timer that is programmable with the one of the processor mode time values, the system mode timer controlling the timing of the powering-down of the processor.

13. The computer system of claim 10 wherein the power management controller is operable to store the processor mode time values.

14. The computer system of claim 10 wherein the processor is operable to monitor processor activity and to correspondingly modify the processor mode time values.

15. The computer system of claim 10 wherein the processor is operable to monitor processor activity and to correspondingly modify the calendar time periods.

16. A computer system, comprising:
    an I/O device;
    a processor coupled with the I/O device and operable to transfer data therefrom or thereto; and
    a power management controller coupled with the I/O device and the processor and operable to power-up the I/O device after the I/O device has been powered-down for a time interval corresponding to one of a plurality of device activation time values, each associated with a respective one of a plurality of calendar time periods.

17. The computer system of claim 16, further comprising a clock coupled with the power management controller and operable to provide a current calendar time, the one of the device activation time values being associated with one of the calendar time periods including the current calendar time.

18. The computer system of claim 16 wherein the power management controller includes a device activation timer that is programmable with the one of the device activation time values, the device activation timer controlling the timing of the powering-up of the I/O device.

19. The computer system of claim 16 wherein the power management controller is operable to store the device activation time values.

20. The computer system of claim 16 wherein the processor is operable to monitor I/O device activity and to correspondingly modify the device activation time values.

21. The computer system of claim 16 wherein the processor is operable to monitor I/O device activity and to correspondingly modify the calendar time periods.

22. A computer system, comprising:
    an I/O device;
    a processor coupled with the I/O device and operable to transfer data therefrom or thereto; and
    a power management controller coupled with the I/O device and the processor and operable to power-up the processor after the processor has been powered-down for a time interval corresponding to one of a plurality of activation time values, each associated with a respective one of a plurality of calendar time periods.

23. The computer system of claim 22, further comprising a clock coupled with the power management controller and operable to provide a current calendar time, the one of the activation time values being associated with one of the calendar time periods including the current calendar time.

24. The computer system of claim 22 wherein the power management controller includes an activation timer that is programmable with the one of the activation time values, the activation timer controlling the timing of the powering-up of the processor.

25. The computer system of claim 22 wherein the power management controller is operable to store the activation time values.

26. The computer system of claim 22 wherein the processor is operable to monitor processor activity and to correspondingly modify the activation time values.

27. The computer system of claim 22 wherein the processor is operable to monitor processor activity and to correspondingly modify the calendar time periods.

28. A computer system, comprising:

an I/O device;

a processor coupled with the I/O device and operable to process periodic events during data transfer operations to or from the I/O device; and a power management controller coupled with the processor and operable to power-down the processor following the processing of one of the periodic events, the power management controller further operable to power-up the processor prior to a next occurring one of the periodic events.

29. The computer system of claim 28 wherein the power management controller includes a device access timer operable to control the timing of powering-up the processor prior to the next occurring one of the periodic events.

30. The computer system of claim 28 wherein the power management controller includes a device access timer operable to control the timing of powering-up the processor prior to the next occurring one of the periodic events, the device access timer being programmable with a device access time interval determined by monitoring previous data transfer operations to or from the I/O device.

31. The computer system of claim 28 wherein the power management controller includes a device access timer operable to control the timing of powering-up the processor prior to the next occurring one of the periodic events, the device access timer being programmable with a device access time interval determined by monitoring previous user interaction with the I/O device.

32. The computer system of claim 28 wherein the power management controller includes a device access timer operable to control the timing of powering-up the processor prior to the next occurring one of the periodic events, the device access timer being programmable with a device access time interval determined from at least one of a plurality of divide parameters provided by the I/O device.

* * * * *

UNITED STATES PATENT AND TRADEMARK OFFICE
CERTIFICATE OF CORRECTION

PATENT NO. : 5,913,067
DATED : June 15, 1999
INVENTOR(S) : Klein

It is certified that error appears in the above-identified patent and that said Letters Patent is hereby corrected as shown below:

| Column | Reads | Should Read |
|---|---|---|
| Column 1, line 54 | "If A instead" | - - If instead - - |

Signed and Sealed this

First Day of May, 2001

NICHOLAS P. GODICI

Attest:

Attesting Officer     Acting Director of the United States Patent and Trademark Office